Oct. 5, 1965 D. SHICHMAN 3,210,227
METHOD OF LAMINATING THERMOPLASTIC SHEETS BY GAS JET HEATING
Filed June 1, 1961 2 Sheets-Sheet 1
FIG. 1.
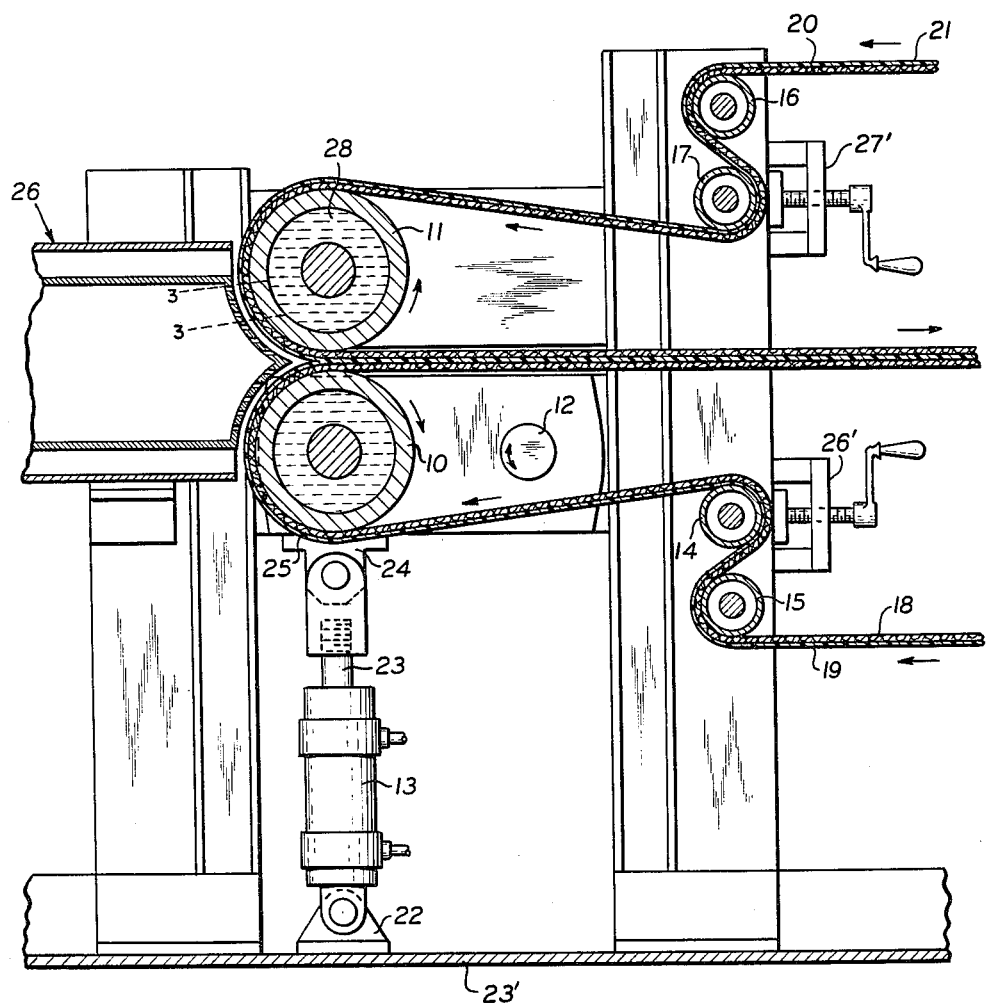
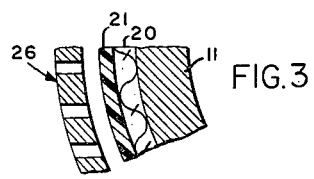
FIG. 3
INVENTOR
DANIEL SHICHMAN
BY
ATTORNEY.

INVENTOR
DANIEL SHICHMAN
BY
ATTORNEY.

United States Patent Office 3,210,227
Patented Oct. 5, 1965

3,210,227
METHOD OF LAMINATING THERMOPLASTIC SHEETS BY GAS JET HEATING
Daniel Shichman, Cedar Grove, N.J., assignor to United States Rubber Company, New York, N.Y., a corporation of New Jersey
Filed June 1, 1961, Ser. No. 114,150
1 Claim. (Cl. 156—82)

This invention is useful in producing laminations of sheet material, such as belting, having thermoplastic surfaces. The invention particularly relates to a method of laminating sheet material in which the bulk of the sheet material cannot be raised to the fusion temperature of the thermoplastic material without being injured.

Manufacture of laminated belting is now accomplished by placing layers of fabric having plastic coated surfaces between the platens of a press and thereafter closing the platens. The plastic is of a thermoplastic composition and when the platens are closed, heat and pressure are simultaneously applied to the laminate until the plastic is entirely fused. The heat is thereafter turned off and the plastic is allowed to cool with pressure still applied to the laminate. The platens are not opened until the entire laminate has cooled below the fusion temperature of the plastic.

There are disadvantages to this method. It is not continuous and one heating and curing cycle may take at least fifteen minutes; when the time required for set-up is included, the production rate of a thirty foot long press is only a little more than one foot of laminated belting per minute. Further, since the fabric used in belting is never of uniform thickness, certain sections of the belting will have been subjected to excess pressure, whereas other sections will receive insufficient pressure and will not form a firm bond. This results in a belt that tends to delaminate in certain areas, and is too rigid in other areas to pass with ease over pulleys. The greatest disadvantage of this method, however, is that in order to heat the thermoplastic to its fusion temperature, between 295–350° F., the fabric (or other tensile material) has, of necessity, also to be heated to that temperature and has to be maintained at this temperature for a significant period. If during this heating period the fabric has been heated beyond the point of initial decomposition, the resulting belt may be deficient in tensile strength because of the damage to the fabric.

Another disadvantage to this method is apparent when laminating foamed materials (such as foam rubber or plastic) to a non-elastic material. During the heating cycle the foam in the press expands and in this state is joined to the other non-elastic material. When the laminated construction is cooled, the foam will again contract; since the other material does not contract as much, a puckered product results.

In my invention, the thermoplastic surfaces of the sheet material which are to be joined are subjected to an impinging high velocity stream of gas at a temperature above the thermoplastic fusion temperature for a period just long enough to cause fusion. Immediately thereafter, the thermoplastic surfaces are joined one to the other and are passed between a pair of rollers. The stream of gas heats the thermoplastic surfaces rapidly so that the thermoplastic is fused before heat conduction has raised the bulk of the sheet material to a temperature sufficient to cause damage thereto.

Therefore an object of this invention is to provide a process for laminating sheet materials having thermoplastic surfaces by heating the thermoplastic surface quickly to avoid undesired heating of the material away from the surface facing the heat source.

Another object of this invention is to provide a process for laminating a sheet having a thermoplastic surface to a foam surface by applying heat to the surfaces to be joined without damaging the remainder of the sheet or foam.

Other objects and advantages will be apparent by referring to the following description and drawing;

FIG. 1 is a front cross-sectional view of one embodiment of this invention used to laminate two fabrics having thermoplastic surfaces.

FIG. 3 is an enlarged fragmentary view taken between lines 3—3 in FIG. 1.

Figure 2:
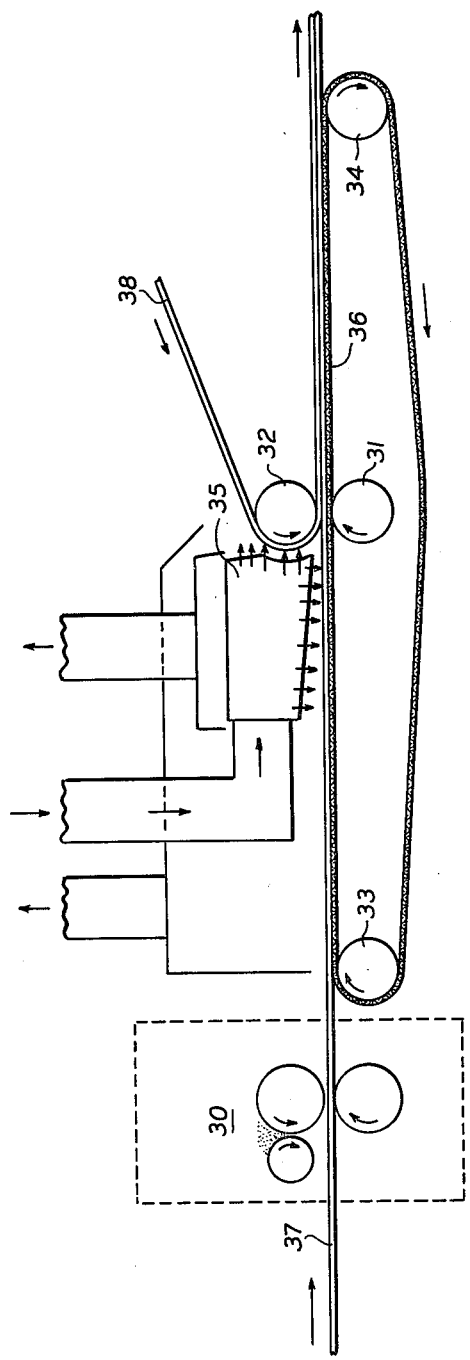
FIG. 2 is a schematic view of another embodiment of the invention used to make a laminate of foam and film.

It is desired to join in laminar form, sheet materials which must be protected except at their surfaces from exposure to temperatures above a given level. These sheets are joined together by means of thermoplastic material disposed on the surfaces to be joined. The fusion temperature of the thermoplastic is above the temperature level to which exposure of the sheet material is to be limited.

This is accomplished by putting heat into the thermoplastic on the surface much more rapidly than heat flows from the thermoplastic into the bulk of the sheet material. In other words a non-equilibrium thermal situation is created. In order to accomplish this rapid input of heat, U, the overall heat transfer coefficient from the heat source to the thermoplastic must be very high, in the range of 50 to 60. This is accomplished by impinging upon the surface of the thermoplastic a high speed jet of hot gas (4,000 to 10,000 feet per minute of air at from 600 to 1000° F.) The materials to be joined are coated with the thermoplastic, exposed to the above described high velocity gas jet, and then immediately joined by being subjected to pressure between a pair of rolls.

In FIGURE 1, there is shown a method and means for laminating belts. Plies of belting fabric which have been previously treated by having thermoplastic material fused to their surfaces, are joined to make a multi-ply belt.

Two laminating drums or rollers, 10 and 11 are mounted one directly above the other, with their axes horizontal. The upper drum 11 is mounted so as to be capable only of rotational motion on its own axis. The lower drum 10, is mounted to be capable of rotational motion on its own axis and the mounting of the shaft of drum 10 is pivoted to rotatable shaft 12. Drum 10 therefore is also capable of motion displacing its axis through a slight arc about pivot 12. This displacement is controlled, and the pressure in the nip between roll 10 and 11 is maintained, by the double acting hydraulic cylinder 13 which thereby controls the size of the gap between drums 10 and 11.

One sheet of belting fabric 18, having on its surface a thermoplastic composition 19, runs from a take-off roller (not shown) around straightening rollers 14 and 15 and then around the bottom of drum 10. Another sheet of fabric 20, also having on its surface a thermoplastic composition 21 (see FIG. 3), is similarly threaded from another take-off roller around straightening rollers 16 and 17 and then around the top of drum 11. The spacing between the drums 10 and 11 is adjusted and the two sheets 18 and 20 meet at the nip formed by drums 10 and 11. During the passage of these sheets around a portion of the back of the two drums 10 and 11, and just preceding their movement into the nip of the drums or rollers, jets of heated gas are impinged upon the surface to be joined by means of a jet heating unit 26. The impinging heated gas melts or softens the thermoplastic surfaces 19 and 21 of the fabric.

These surfaces are pressed together to form a laminate as they pass through the nip of the drums. This laminate then issues from the nip and passes forward from the drums 10 and 11 away from the heat to a cooling space. The speed of the laminate, as it emerges is set so that the thermoplastic surfaces are not overheated and thereby damaged. After sufficient cooling has occurred to resolidify the thermoplastic composition, the laminate is wound up on a take-up reel.

The axes of rolls 14, 15, 16, and 17 define a plane and are parallel within that plane. However, adjusting means 26' and 27' mounted near rolls 14 and 17 respectively, make it possible to tilt these rolls so that their axes are no longer parallel with the axes of rolls 15 and 16 respectively, but nevertheless remain in the plane. This technique assures perfect overlap of the sheets to be laminated.

Cylinder 13 is mounted on a clevis 22 attached to the bottom frame 23' which supports the entire apparatus. Attached to piston rod 23, is a head 24 which has a curved surface 25 to accommodate drum 10. When piston rod 23 rises, entire drum 10 is rotated clockwise about pivot 12, while at the same time, the entire pivot means comprising cylinder 13, rod 23, and head 24 is rotated slightly clockwise about clevis 22.

Each of the drums 10 and 11 may be constructed as described in my patent application, S.N. 127,416, filed concurrently herewith, the contents of which are incorporated in this disclosure by this reference for all purposes. As shown, drums 10 and 11 are hollow and comprise essentially a cylindrical steel body, the opposite ends of which are closed. Each drum has a base metallic exterior. The interior of each drum communicates with suitable piping so that water or other suitable cooling fluid 28 may be circulated through each drum. The cooling fluid may conveniently have a temperature of 32° F. to 120° F.

Heat is applied to the thermoplastic surfaces 19 and 21 by means of a jet unit 26, which may be referred to as a heating box closed on all its sides except at the end facing the drum. Within the box, there is arranged a jet or nozzle member which has the form of a substantially rectangular body having top, bottom, side, and rear walls. The jet is mounted for reciprocal movement within the enclosure.

At its front end, the jet unit 26 is provided with a perforated orifice plate through which a gaseous heating fluid can flow toward the drums 10 and 11. The orifice plate is doubly arcuate in cross-section, the curvature of which is substantially the same as that of the drums 10 and 11, but it will be understood that the curvature of the orifice plate may be different from that of the drums, varying therefrom either symmetrically or asymmetrically relative to the horizontal center plane of the drum, depending on the operating conditions sought to be established. Jet unit 26 is completely analagous to that more fully described in my above mentioned patent application, except for the fact that the end facing the pair of drums comprises a jet plane made to conform to the nip of the drums. Means (not shown) are provided to vary the spacing between the jet unit and the surface of the drum.

The jet unit 26 is provided with a conduit which communicates at its other end with the outlet end of a combustion or heating chamber in which is arranged an open flame gas burner to which air and commercial illuminating or natural gas may be fed in desired quantities. The inlet end of the chamber communicates with the discharge side of a blower.

As drums 10 and 11 rotate, the portion thereof carrying the thermoplastic layers 19 and 21 enters the heating zone defined by the open end of the jet unit 26. At this zone, the thermoplastic layer is subjected to the impinging action of a high velocity jet of a hot gaseous fluid to raise only the thermoplastic layers to their fusion temperatures, while the remainder of the sheets remain substantially below their fusion or deterioration temperature, as the case may be. The temperature of the hot air, which flows at a linear velocity ranging from about 4,000 feet per minute to about 10,000 feet per minute, is between about 600° F. and about 1000° F. and preferably between about 650° F. and about 800° F.

The use of a jet of hot gas or air as the means for heating the thermoplastic surfaces is a critical feature of the present invention. If the heat is supplied by means of electrical heating elements or by heat-radiating devices such as lamps, not only is the apparatus as a whole rendered more complex and expensive, but it is found that the value of the coefficient of heat transfer (U) attainable ranges only from about 2 to 10. This is apparently due to the fact that a layer of stagnant air collects over the surface layer and acts as an insulating medium between the heat source and the film-forming layer. However, this drawback is eliminated through the use of a high velocity jet of air as the heating medium which, due to the turbulent flow conditions created as the thermoplastic layer surface, dispels the strata of stagnant insulating air. In this manner, it is possible to obtain values of U as high as about 50 to 60 which are necessary to enable the fusion of the entire film without decomposition of material closest to the heat source to be attained.

It is to be particularly noted, in this connection, that it is the use of a high velocity jet of gas or air impinging on the thermoplastic layer surface which leads to the highly advantageous results mentioned above. Stated in other words, the heating fluid must flow at high speed in a direction which is preferably normal to the layer surface (see FIG. 3) and under any circumstances is not inclined more than about 60° to the normal. Heating fluid flowing in a direction substantially tangential to the layer surface is found to be incapable of yielding the desired effects and high U values, probably due to the fact that this type of flow leaves the insulating layer of stagnant air adjacent to the thermoplastic surface undisturbed. For probably a very similar reason, air velocities below about 4,000 feet per minute are not to be employed as it is found that in this range the heat transfer coefficient U falls off very rapidly. On the other hand, air flow speeds above about 10,000 feet per minute (somewhat higher if the thermoplastic layer is in the form of highly viscous plastisol) are also generally not advantageous (despite a possible increase of the heat transfer coefficient U) due to the fact that at such velocities rippling of the melted thermoplastic layer occurs which may lead to the formation of waviness in the cured thermoplastic surface.

*Foam-sheet laminator*

At FIG. 2, there is shown another device using the method of the invention to join elastic foam sheet material that cannot support its own weight to thermoplastic sheet materials.

The foam sheet 37 is first coated on the surface to be bonded with a thin film of the plastisol material, by means of a roll coating device 30 for example. The non-self-supporting sheet foam material coated with plastisol is then carried to the nip of the laminating drums 31 and 32, on a steel mesh belt 36. This endless belt moves between rolls 33 and 34 and over drum 31. The thermoplastic film 38 which forms the outer portion of the laminate is fed from a let-off (not shown) over the top of drum 32 and enters the nip of the drums together with the foam sheet. Before entering the nip, the surfaces to be joined are subjected to the hot gas jet emanating from the jet heating unit 35 which is the same as that described in connection with FIG. 1, except for the shape of the orifice. The jet plate is shaped to conform a drum 32 and a portion of the steel mesh belt. The rolls 31 and 32 are mounted and constructed similarly to the rolls 10 and 11 described in belt laminator above.

After the laminate of foam 37 and film 38 issues from the drums 31 and 32 still supported on the belt, it is subjected to air at lower temperature for a sufficient time to allow for cooling. After cooling, the laminate no longer requires the support of the steel mesh belt and is fed to a take-up reel (not shown). The material made in this fashion may be sent through an embossing process to imprint the film surface.

Having thus described my invention, what I claim and desire to protect by Letters Patent is:

A process of laminating sheets of material having surfaces formed of a thermoplastic composition comprising the steps of: impinging the outer surfaces of said composition with jets of gas, said gas being directed at an angle not more than 60° to a plane normal to said surface, at a velocity of 4,000 to 10,000 feet per minute and at a temperature of 600° F. to 1,000° F. to fuse said outer surfaces while maintaining the remainder of said sheets below their fusion temperatures; pressing said outer surfaces together while at their fusion temperatures; and rapidly extracting heat from the pressed sheets.

References Cited by the Examiner

UNITED STATES PATENTS

| | | | |
|---|---|---|---|
| 2,423,237 | 7/47 | Haslacher | 156—306 XR |
| 2,757,711 | 8/56 | Petry et al. | 156—498 XR |
| 2,794,485 | 6/57 | Ashton et al. | 156—498 |
| 2,957,793 | 10/60 | Dickey | 156—82 |
| 3,075,868 | 1/63 | Long | 156—82 |

FOREIGN PATENTS

| | | |
|---|---|---|
| 567,456 | 12/58 | Canada. |
| 1,096,292 | 1/55 | France. |

EARL M. BERGERT, *Primary Examiner.*